US008614005B2

(12) United States Patent
Wursche et al.

(10) Patent No.: US 8,614,005 B2
(45) Date of Patent: Dec. 24, 2013

(54) POLYAMIDE BLEND FILM

(75) Inventors: Roland Wursche, Duelmen (DE); Sonja Bollmann, Haltern am See (DE); Harald Haeger, Luedinghausen (DE); Martin Wielpuetz, Senden (DE); Kirsten Alting, Muenster (DE); Michael Beyer, Raesfeld (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 12 days.

(21) Appl. No.: 13/332,470

(22) Filed: Dec. 21, 2011

(65) Prior Publication Data

US 2012/0094116 A1 Apr. 19, 2012

Related U.S. Application Data

(62) Division of application No. 11/816,556, filed as application No. PCT/EP2006/050038 on Jan. 4, 2006, now abandoned.

(30) Foreign Application Priority Data

Feb. 19, 2005 (DE) .................. 10 2005 007 665

(51) Int. Cl.
  B32B 27/20 (2006.01)
  B32B 27/34 (2006.01)
(52) U.S. Cl.
  USPC .......... 428/474.4; 428/31; 428/615; 428/332; 428/474.7; 525/420; 525/432
(58) Field of Classification Search
  USPC ............... 428/31, 615, 332, 474.4, 474.7; 525/420, 432
  See application file for complete search history.

(56) References Cited

U.S. PATENT DOCUMENTS

| | | | |
|---|---|---|---|
| 5,032,633 A * | 7/1991 | Schlobohm et al. .......... 524/168 |
| 5,313,987 A | 5/1994 | Rober et al. | |
| 5,404,915 A | 4/1995 | Mugge et al. | |
| 5,500,263 A | 3/1996 | Rober et al. | |
| 5,512,342 A | 4/1996 | Rober et al. | |
| 5,554,426 A | 9/1996 | Rober et al. | |
| 5,798,048 A | 8/1998 | Ries | |
| 5,858,492 A | 1/1999 | Roeber et al. | |
| 6,090,459 A | 7/2000 | Jadamus et al. | |
| 6,161,879 A | 12/2000 | Ries et al. | |
| 6,335,101 B1 | 1/2002 | Haeger et al. | |
| 6,355,358 B1 | 3/2002 | Boer et al. | |
| 6,391,982 B1 | 5/2002 | Haeger et al. | |
| 6,407,182 B1 | 6/2002 | Maul et al. | |
| 6,428,866 B1 | 8/2002 | Jadamus et al. | |
| 6,451,395 B1 | 9/2002 | Ries et al. | |
| 6,491,994 B1 * | 12/2002 | Kito et al. ................... 428/36.5 |
| 6,528,137 B2 | 3/2003 | Franosch et al. | |
| 6,538,073 B1 | 3/2003 | Oenbrink et al. | |
| 6,579,581 B2 | 6/2003 | Bartz et al. | |
| 6,660,796 B2 | 12/2003 | Schueler et al. | |
| 6,677,015 B2 | 1/2004 | Himmelmann et al. | |
| 6,680,093 B1 | 1/2004 | Ries et al. | |
| 6,726,999 B2 | 4/2004 | Schueler et al. | |
| 6,766,091 B2 | 7/2004 | Beuth et al. | |
| 6,783,821 B2 | 8/2004 | Ries et al. | |
| 6,793,997 B2 | 9/2004 | Schmitz | |
| 6,794,048 B2 | 9/2004 | Schmitz et al. | |
| 7,025,842 B2 | 4/2006 | Monsheimer et al. | |
| 7,135,525 B2 | 11/2006 | Petter et al. | |
| 7,148,286 B2 | 12/2006 | Baumann et al. | |
| 7,175,896 B2 | 2/2007 | Schmitz et al. | |
| 7,317,044 B2 | 1/2008 | Monsheimer et al. | |
| 2001/0018105 A1 | 8/2001 | Schmitz et al. | |
| 2002/0142118 A1 | 10/2002 | Schmitz et al. | |
| 2002/0179888 A1 | 12/2002 | Montanari et al. | |
| 2003/0072987 A1 | 4/2003 | Ries et al. | |
| 2003/0124281 A1 | 7/2003 | Ries et al. | |
| 2003/0212174 A1 | 11/2003 | Peirick et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0140668 A1 | 7/2004 | Monsheimer et al. | |
| 2004/0202908 A1 | 10/2004 | Schmitz et al. | |
| 2004/0232583 A1 | 11/2004 | Monsheimer et al. | |
| 2005/0027050 A1 | 2/2005 | Monsheimer et al. | |
| 2005/0228145 A1 * | 10/2005 | Lacroix et al. ............... 525/420 |
| 2006/0071359 A1 | 4/2006 | Monsheimer et al. | |
| 2006/0078752 A1 | 4/2006 | Schmitz et al. | |
| 2006/0083882 A1 | 4/2006 | Schmitz et al. | |
| 2006/0099478 A1 | 5/2006 | Schmitz et al. | |
| 2006/0100323 A1 | 5/2006 | Schmidt et al. | |
| 2006/0134419 A1 | 6/2006 | Monsheimer et al. | |
| 2006/0141188 A1 | 6/2006 | Schmitz et al. | |
| 2006/0189784 A1 | 8/2006 | Monsheimer et al. | |

(Continued)

FOREIGN PATENT DOCUMENTS

EP    0 568 988    11/1993
WO    92 12008    7/1992

OTHER PUBLICATIONS

U.S. Appl. No. 13/649,498, filed Oct. 11, 2012, Pawlik, et al.
U.S. Appl. No. 13/649,319, filed Oct. 11, 2012, Pawlik, et al.

*Primary Examiner* — Ana Woodward
(74) *Attorney, Agent, or Firm* — Oblon, Spivak, McClelland, Maier & Neustadt, L.L.P.

(57) ABSTRACT

A film whose outer layer is composed of a molding composition which is in essence composed of the following components:

a) from 3 to 50% by weight of a polyamide, selected from the group of PA11 and PA12, and b) from 50 to 97% by weight of a polyamide, selected from the group of PA1012 and PA1212, where the percentages are based on the entirety of components a) and b), is suitable for decoration of moldings which retain their gloss during their service time.

16 Claims, No Drawings

(56) References Cited

U.S. PATENT DOCUMENTS

| | | |
|---|---|---|
| 2006/0202395 A1 | 9/2006 | Monsheimer et al. |
| 2006/0223928 A1 | 10/2006 | Monsheimer et al. |
| 2006/0244169 A1 | 11/2006 | Monsheimer et al. |
| 2006/0281873 A1 | 12/2006 | Alting et al. |
| 2006/0292387 A1 | 12/2006 | Kuhmann et al. |
| 2007/0013108 A1 | 1/2007 | Monsheimer et al. |
| 2007/0104971 A1 | 5/2007 | Wursche et al. |
| 2007/0126159 A1 | 6/2007 | Simon et al. |
| 2007/0148388 A1 | 6/2007 | Kuhmann et al. |
| 2007/0166560 A1 | 7/2007 | Wursche et al. |
| 2007/0182070 A1 | 8/2007 | Monsheimer et al. |
| 2007/0183918 A1 | 8/2007 | Monsheimer et al. |
| 2007/0197692 A1 | 8/2007 | Monsheimer et al. |
| 2007/0232753 A1 | 10/2007 | Monsheimer et al. |
| 2007/0238056 A1 | 10/2007 | Baumann et al. |
| 2008/0116616 A1 | 5/2008 | Monsheimer et al. |
| 2008/0166496 A1 | 7/2008 | Monsheimer et al. |
| 2008/0166529 A1 | 7/2008 | Hager et al. |
| 2008/0213552 A1 | 9/2008 | Hager et al. |
| 2008/0217821 A1 | 9/2008 | Goring et al. |
| 2008/0249237 A1 | 10/2008 | Hager et al. |
| 2008/0261010 A1 | 10/2008 | Wursche et al. |
| 2009/0286096 A1 | 11/2009 | Alting et al. |
| 2010/0003524 A1 | 1/2010 | Luetzeler et al. |
| 2010/0003534 A1 | 1/2010 | Luetzeler et al. |
| 2010/0055425 A1 | 3/2010 | Luetzeler et al. |
| 2010/0221551 A1 | 9/2010 | Wursche et al. |
| 2011/0045269 A1 | 2/2011 | Wursche et al. |

\* cited by examiner

POLYAMIDE BLEND FILM

This is a divisional application of U.S. application Ser. No. 11/816,556, filed Jan. 28, 2008, which is a 371 of PCT/EP06/050038 filed on Jan. 4, 2006.

The present invention relates to a film which comprises a layer composed of a polyamide blend, and is suitable for decoration of moldings.

The current standard process for decoration of external areas on automobiles is painting. However, this procedure firstly generates high manufacturing costs, resulting from provision of specific plant and the operating cost associated therewith for the automobile producer, and secondly causes pollution of the environment. Pollution of the environment derives by way of example from solvent constituents released from the paints used, and also from accumulation of paint residues, which have to follow correct disposal routes.

Another factor is that painting has only limited suitability for decorating the surfaces of plastics components, which in recent years have become more popular in automobile construction, because of the saving in weight and cost.

The process of painting plastics components which are components of bodywork can, for example, be carried out on-line, the plastics part being subjected to a paint treatment identical with that for the metallic components. This leads to a uniform color, but is attended by high temperatures resulting from the cathodic electrodeposition method conventional here, and this makes the selection of material more difficult. In addition, identical adhesion of the paint formulation has to be ensured on very different substrates. If the process of painting the plastics parts is carried out in a separate step (known as off-line painting), comprising process conditions more advantageous for plastics, the problem of colormatching arises, meaning that the shade achieved on the metal has to be matched precisely. However, the differences in substrate and in the underlying paint formulation that can be used, and process conditions, make this very difficult to achieve. If there is a color difference prescribed via the design, a serious disadvantage that remains is provision of a second set of painting equipment for the plastics parts and the cost associated therewith, and additional time required for manufacture of the automobile also has to be considered. Direct use of the untreated, generally injection-molded plastics parts is aesthetically disadvantageous, because surface defects resulting from the process, such as weld lines, air inclusions, and also necessary reinforcing fillers, such as glass fibers, are clearly discernible here. This is intolerable in visible regions. Consequently, improvement of surface quality has to be undertaken, for example in the context of a painting process, frequently requiring much work for pretreatment via polishing and application of relatively thick layers of a primer.

One proposed solution consists in the use of multilayered plastics films, used to cover the components and then requiring no painting. The bond between substrate and decorating film here can be achieved via a number of manufacturing processes. By way of example, the film can be laminated to the substrate, or it is possible to select a process of reverse coating by an injection-molding process, in which the film is placed in the injection mold during component production. The concept of a film as carrier of decoration is also in line with a trend toward individualization of design elements on automobiles. Specifically, this trend leads to a wider range of models in the manufacturing process, but with a reduction in the number of respective components manufactured per series. The use of films permits rapid, problem-free design change, and can therefore meet this challenge. An important factor here is that the film complies with the standards demanded in the automobile industry with respect to surface properties (class A surface), solvent resistance, and appearance. These films likewise have good capability for use in the design of interior surfaces in automobiles.

Decorative films of this type are in principle known. EP 0 949 120 A1 describes by way of example decorative films with a transparent outer layer composed of polyurethane, polyacrylate, fluoropolymer, or mixtures composed of fluoropolymer and polyacrylate. WO 94/03337 and EP 0 285 071 A2 disclose similar decorative films.

Another application sector for decorative films is as a carrier of decoration, for example for topcoats of sports equipment, e.g. skis or snowboards, or of household items. Single-layer films whose topsides or undersides have been printed are often used here. For example, the utility model DE 295 19 867 U1 describes a decorable film composed of a copolyamide which is composed of the following monomer units: laurolactam, and also caprolactam and/or hexamethylenediamine/dicarboxylic acid. The article by M. Beyer and J. Lohmar, Kunststoffe 90 (2000) 1, pp. 98-101 gives examples of printable films composed of PA12 molding compositions.

The property profile of polyamides, for example impact resistance and chemical resistance, very generally gives them, and in particular polyamides based on PA12 or PA11, good suitability for production of these decorative films. Accordingly, the patent literature has descriptions of decorative films or else protective films which comprise an outer layer composed of a polyamide. Examples which may be mentioned here are the specifications JP60155239A, JP2003118055A, EP 1 302 309 A, EP 0 522 240 A, EP 0 694 377 A, EP 0 734 833 A, WO 9212008 A, and EP 0 568 988 A.

While high polarity of outer layers composed of polyamides with a high density of carboxamide groups gives them inadequate chemicals resistance and excessive water absorption, in practice it is found that use of polyamides which have a low density of carboxamide groups and which have been prepared from lactams or from the corresponding aminocarboxylic acids (AB polyamides) leads to formation of deposits on the surface of the films under ambient conditions over the course of time, these deposits considerably reducing gloss and being unacceptable for this application. Improvement in transparency and in initial gloss would also be desirable. If, in contrast, polyamides composed of diamine and dicarboxylic acid (AABB polyamides) which have a low density of carboxamide groups are used, no deposits are formed, but here again an improvement in transparency and gloss would be advantageous.

It was therefore an object, for decorative purposes, to provide a film which gives reduced deposit formation, and whose outer layer is sufficiently transparent, and which has high initial gloss.

This object is achieved via a film whose outer layer is composed of a molding composition which is in essence composed of the following components:

a) from 3 to 50%, preferably from 4 to 49% by weight, particularly preferably from 5 to 47% by weight, and with particular preference from 10 to 45% by weight, of a polyamide, selected from the group of PA11 and PA12, and b) from 50 to 97%, preferably from 51 to 96% by weight, particularly preferably from 53 to 95% by weight, and with particular preference from 55 to 90% by weight, of a polyamide, selected from the group of PA1012 and PA1212, where the percentages are based on the entirety of components a) and b).

The polyamides used and their preparation are known. They are commercially available in a wide variety of marketed grades. According to the invention, the respective homopolyamides are mainly used, but it is also possible to use copolyamides based thereon and incorporating at most 20 mol %, at most 15 mol %, at most 10 mol %, or at most 5 mol %, of comonomers. Suitable comonomers are lactams, the corresponding aminocarboxylic acids, or the combination of diamine and dicarboxylic acid. Diamine and dicarboxylic acid are respectively counted individually in the calculation of the constitution.

Incorporation of comonomers leads to improved transparency and to higher gloss, but there is some impairment of resistance to chemicals and to environmental effects. The latter can be accepted if use of the comonomers is successful in giving better compatibility for example with respect to the following layer or with respect to the substrate, by bringing the constitution somewhat closer.

The molding composition is prepared from the individual components according to the prior art via mixing in the melt. It can also comprise the following other components:
a) nucleating agents, selected from nanoscale fillers and basic metal salts, metal oxides, or metal hydroxides; the amount added of the latter, in order to ensure the desired transparency, is at most that which can be dissolved in the melt by reaction with the carboxy end groups of the polyamides;
b) conventional auxiliaries and conventional additives, the amounts being those conventional for polyamide molding compositions, examples being stabilizers or lubricants,
c) colorants which do not significantly affect transparency,
d) fillers whose refractive index differs only to a very slight extent from that of the matrix, or is precisely identical (isorefractive fillers), and also
e) other polymer components whose refractive index differs only very slightly from that of the matrix or is precisely identical.

The amount of these other components present in the molding composition is preferably at most 30% by weight, at most 25% by weight, at most 20% by weight, at most 15% by weight, at most 10% by weight, or at most 5% by weight.

Surprisingly, if the molding composition comprises at most 50% by weight of the AB polyamide (PA11 or PA12), gloss is retained as for the pure AABB polyamides during service life, although this would not be expected in view of the mixing ratio of the polyamides. Apparently, as long as at least 50% by weight of the AABB polyamide is present, it inhibits diffusion of the substances that form deposits and are present in the AB polyamide, possibly cyclic oligomers. Another advantage here is that the mixture of the semicrystalline polyamides give blends which are semicrystalline, but sufficiently transparent. Transparency and initial gloss are above the level of the pure components, while resistance to chemicals and environmental effects is retained. Explicit mention may be made here of the combinations PA11/PA1012, PA11/PA1212, PA12/PA1012, and PA12/PA1212, but the AB component can moreover be, independently of one another, a mixture of PA11 and PA12, and the AABB component a mixture of PA 1012 and PA1212.

The film is a single- or multilayer film. In the case of a multilayer structure, the nature and number of the other layers depend on the technical requirements of the application; the only decisive factor is that the outer layer is composed of the inventively used molding composition. By way of example, the following embodiments are possible:
1. The film is a single-layer film. In this case it is defined as composed only of the outer layer; decorative effects can be applied either to the topside or to the underside via printing, e.g. by means of thermal sublimation printing.
2. The film comprises not only the outer layer but also a lower color layer. The color layer can be a paint layer; however, as in the prior art it is preferably composed of a colored thermoplastics layer. The thermoplastic can by way of example be a mixture identical with or similar to that of the outer layer, one component thereof, or another polyamide, or another polymer, which either adheres directly to the outer layer or has been adhesive-bonded with the aid of a sufficiently transparent adhesion promoter (for example a polyolefin functionalized by carboxy or anhydride groups or by epoxy groups, a thermoplastic polyurethane, or a blend composed of the constituents of the layers to be bonded). Examples of colorants that may be used are organic dyes, inorganic or organic pigments, or metal flakes.
3. The film comprises not only an outer layer and, if appropriate, a color layer, but also another layer which, as carrier layer, brings about sufficient mechanical strength and, if appropriate, also brings about coupling to the substrate.
4. The film comprises not only the outer layer and, if appropriate, a color layer, but also a lower adhesion-promoter layer for coupling to the substrate. Examples of suitable adhesion promoters are a polyolefin functionalized by carboxy or anhydride groups or by epoxy groups, a thermoplastic polyurethane, a blend composed of the materials of the layer to be bonded and of the substrate, or one of the adhesion promoters disclosed in the German patent application No. 102004029217.5 of Jun. 16, 2004.
5. The film comprises not only the outer layer, and, if appropriate, a color layer and carrier layer, but also a lower adhesion-promoter layer for coupling to the substrate. The comments made under item 4 again apply to the adhesion promoter.
6. The film, e.g. a film in one of items 1 to 5, also comprises, if necessary, for example in the case of increased scratch-resistance requirements, a protective layer, such as a polyurethane-based clear lacquer, on the outer layer. A protective layer in the form of a lacquer can also have been modified as in the prior art in order to increase scratch resistance. Besides this, another possibility is to generate a protective layer by way of vacuum deposition processes. The film can, if appropriate, also comprise a peelable protective film applied by lamination, which provides protection during transport or installation, and which is peeled away after production of the composite part.

In the case of embodiments 2 to 6, the transparent outer layer may first, like a monofilm, be printed from one side or from both sides and then be bonded in a second step to the other layers to give the multilayer film. In multilayer films, the transparent outer layer can be printed from above. The outer layer may also have transparent or opaque coloring.

In one preferred embodiment, the color layer and/or the carrier layer comprises a molding composition in particular of a polyetheramide or of a polyetheresteramide, and preferably of a polyetheramide or polyetheresteramide based on a linear aliphatic diamine having from 6 to 18, preferably from 6 to 12, carbon atoms, on a linear aliphatic, or an aromatic, dicarboxylic acid having from 6 to 18, preferably from 6 to 12, carbon atoms, and on a polyether having an average of more than 2.3 carbon atoms per oxygen atom and having a number-average molecular weight of from 200 to 2000 for the polyether blocks. The molding composition of this layer can comprise other blend components, e.g. polyacrylates or polyglutarimides having carboxy or anhydride groups or epoxy groups, a rubber containing functional groups, and/or a polyamide. Molding compositions of this type are prior art; by way of example, they are described in EP 1 329 481 A2 and DE-A 103 33 005, expressly incorporated herein by way of reference. In order to ensure good layer adhesion, it is advantageous here for the polyamide content of the polyamide elastomer to be composed of monomers which are identical with those used in one of the components of the outer layer. As an alternative to the polyamide elastomers, the color layer and/or the carrier layer can also comprise a conventional impact-modifying rubber alongside a polyamide. An advantage of these embodiments is that in many cases there is no need for any thermoforming of the film as a separate step prior to reverse coating by an injection-molding method, because reverse coating by an injection-molding method also simultaneously subjects the film to a forming process.

In one preferred embodiment, the thickness of the film or multilayer film with the inventive outer layer is from 0.02 to 1.2 mm, particularly preferably from 0.05 to 1 mm, very particularly preferably from 0.1 to 0.8 mm, and with particular preference from 0.2 to 0.6 mm. If the material is a multilayer film, the thickness of the inventive outer layer in one preferred embodiment is from 0.01 to 0.5 mm, particularly preferably from 0.02 to 0.3 mm, very particularly preferably from 0.04 to 0.2 mm, and with particular preference from 0.05 to 0.15 mm. The film is produced by means of known methods, for example via extrusion, or in the case of multilayered systems via coextrusion or lamination. It can then, if appropriate, be subjected to a forming process.

In one embodiment, the film is a decorative film. For the purposes of the invention, decorative films are films which can be printed and/or comprise a color layer, and moreover are intended for bonding to a substrate in order to decorate its surface. The decoration can also be brought about by using a lamination process on visual surface defects, e.g. by hiding surface roughness deriving from fillers or from reinforcing materials.

Examples of methods of coherent bonding of the film to the substrate are adhesive bonding, pressing, lamination, or coextrusion, or reverse coating by an injection-molding, foaming, or compression-molding method. In order to achieve better adhesion, the film can by way of example be previously flame-treated or treated with a plasma. Prior to formation of the bond between film and substrate, the film can also be subjected to mechanical treatment or forming processes, e.g. via thermoforming or other processes. The surface can be structured via embossing, for example. The surface can also be pre-structured in the context of film extrusion, for example using specifically designed rolls. The resultant composite part can then also be subjected to a forming process.

Examples of suitable substrates are molding compositions based on polyolefins, on polyamides, on polyesters, on polycarbonates, on ABS, on polystyrene, or on styrene copolymers.

In one preferred embodiment, the inventive film is used as outer layer of a film composite for the design or decoration of surfaces on and in automobiles and utility vehicles, the film having been adhesive-bonded to a plastics substrate. The correspondingly designed component can be of sheet-like structure, an example being a bodywork part, for example a roof module, wheel surround, engine cover, or door. Other possible embodiments are those in which the components produced are elongate, with or without curvature, for example cladding, e.g. the cladding on what are known as A columns of an automobile, or decorative and cover strips of any type. Another example is provided by protective cladding for door sills. Alongside applications in motor-vehicle exteriors, constituents of the interior can also be advantageously decorated via the inventive films, in particular decorative elements such as strips and panels, because impact resistance and resistance to chemicals, such as cleaners, is also required in the interior.

In another preferred embodiment, the inventive film is used as topcoat for snowboard-like equipment of any type, such as skis or snowboards.

The film can moreover be used by way of example as a protective film to counter soiling, UV radiation, effects of weathering, chemicals, or abrasion, or as a barrier film on vehicles, in the household, on floors, on tunnels, on tents, and on buildings, or as a carrier of decorative effects, for example for topcoats of sports equipment, of boats, of aircraft, in the household, or on buildings.

The invention is illustrated below by way of example.

The PA12 used was a grade whose relative solution viscosity $\eta_{rel}$, determined to ISO 307, was 2.1 and whose crystallite melting point $T_m$, determined to ISO 11357, was 178° C.

The PA1012 used was a grade whose relative solution viscosity $\eta_{rel}$ was 1.9 and whose crystallite melting point $T_m$ was 191° C.

The molding composition was prepared via mixing in the melt in a Werner+Pfleiderer ZSK M9/2 twin-screw extruder. The barrel temperature was 250° C., the rotation rate was 250 rpm, and the throughput was 10 kg/h. The melt was filtered at 25μ.

Injection-molded plaques were produced on an Engel ES 600/150 injection molding machine. The melt temperature was 250° C., and the mold temperature was 80° C. Dimensions of the plaques produced were 130 mm×130 mm×1 mm.

Monofilms were produced by the calendering process on a Collin 168/400 multilayer film calender at a processing temperature of 240° C. The thickness was 400 μm.

Monofilms were produced by the calendering process on a Collin 168/400 multilayer film calender at a processing temperature of 240° C. (outer layer) and 240-250° C. (color layer). The thickness of the outer layer was 100 μM, and the thickness of the color layer was 400 δm. The colorant layer used comprised a blend composed of 28.0% by weight of PA12 ($\eta_{rel}$=2.1), 68.5% by weight of a polyetheresteramide having PA12 hard blocks ($M_n$=7000) and having PTHF soft blocks ($M_n$=1000), and 2.0% by weight of a stabilizer masterbatch, and also 1.5% by weight of color powder masterbatch, the color used being E70237.

Accelerated weathering was carried out on monofilms, using Q-UV/se accelerated-weathering equipment from Q-Panel with a cycle (Step 1: 55° C., exposure to light at 0.98 W/m$^2$ at 340 nm, 4 h/Step 2: 45° C., water condensation in dark conditions, 4 h).

Injection-molded plaques were stored in a cabinet under controlled temperature and humidity conditions at 85° C. and 99% relative humidity.

Gloss measurements were carried out on plaques and films to DIN 67 530.

Transmittance was measured on films of thickness 400 μm to ISO 13468-2.

INVENTIVE EXAMPLES 1-4 AND COMPARATIVE EXAMPLES A-E

Tables 1 to 5 give constitutions and results.

TABLE 1

| | Constitution of outer layer | | |
|---|---|---|---|
| Example | PA1012 (parts by weight) | PA12 (parts by weight) | Stabilizers (parts by weight) |
| A | 100 | | |
| B | | 100 | |

TABLE 1-continued

Constitution of outer layer

| Example | PA1012 (parts by weight) | PA12 (parts by weight) | Stabilizers (parts by weight) |
|---|---|---|---|
| C | 20 | 80 | |
| 1 | 60 | 40 | |
| 2 | 80 | 20 | |
| D | 20 | 80 | 0.8 |
| E | 40 | 60 | 0.8 |
| 3 | 60 | 40 | 0.8 |
| 4 | 80 | 20 | 0.8 |

TABLE 2

Transparency of monofilms (400 μm)

| Example | A | B | C | 1 | 2 |
|---|---|---|---|---|---|
| Transparency (at 500 nm) | 88.2% | 87.6% | 89.4% | 89.8% | 89.1% |

TABLE 3

Formation of deposit on accelerated weathering (gloss measurement at 60° on 400 μm films; data in gloss units)

| Time (h) | A | B | 3 | 4 | D | E |
|---|---|---|---|---|---|---|
| 0[a] | 126 | 97 | 131 | 129 | 116 | 115 |
| 24 | 124 | 78 | 127 | 131 | 107 | 80 |
| 168 | 120 | 84 | 126 | 130 | 100 | 98 |
| 336 | 118 | 60 | 121 | 131 | 78 | 92 |
| 504 | 120 | 58 | 120 | 132 | 82 | 91 |
| 672 | 125 | 69 | 119 | 133 | 81 | 94 |
| 840 | | | 120 | 132 | 83 | 87 |
| 1008 | | | 118 | 131 | 78 | 92 |
| 1176 | | | 120 | 132 | 75 | 89 |
| 1344 | | | 120 | 131 | 70 | 92 |
| 1512 | | | 120 | 132 | 67 | 95 |
| 1680 | | | 121 | 132 | 68 | 97 |
| 2016 | | | 117 | 134 | 75 | 88 |
| 2352 | | | 119 | 129 | 72 | 67 |
| 3192 | | | 116 | 126 | | |

[a]Initial gloss

TABLE 4

Formation of deposit on storage in moist conditions (gloss measurement at 85° on plaques; data in gloss units)

| Storage time in days | A | 3 | 4 | D | E |
|---|---|---|---|---|---|
| 0 | 94.7 | 101.4 | 94.9 | 102.8 | 100.7 |
| 3 | 98 | 102.3 | 99.2 | 96.6 | 101.1 |
| 6 | 98.4 | 101.4 | 98.3 | 58.8 | 88.8 |
| 10 | 97.7 | 101.8 | 99.2 | 59.1 | 89.5 |
| 14 | 97.6 | 102.2 | 99.5 | 53.9 | 84.6 |
| 21 | 97.1 | 101.3 | 98.7 | 33.3 | 77.4 |
| 25 | 96.3 | 101.4 | 98.3 | 41.9 | 75.1 |
| 32 | 96.1 | 101.3 | 98.1 | 26.4 | 61 |
| 39 | 95.7 | 100.4 | 97.6 | 17 | 56.1 |
| 46 | 97.4 | 103.6 | 100.5 | 14.7 | 45.5 |
| 52 | 94.5 | 100.2 | 98.5 | 15 | 44.1 |

TABLE 5

Multilayer film, initial gloss at 20° (data in gloss units)

| Example | D | 3 | 4 |
|---|---|---|---|
| Gloss | 80 | 84 | 85 |

What is claimed is:

1. A composite part, comprising a substrate and a film capable of accepting printing and/or coloring thereon whose outer layer is transparent, and has initial gloss and retained gloss during use, and comprises a molding composition comprising the following components:
   a) from 3 to 50% by weight of the polyamide PA11, and
   b) from 50 to 97% by weight of a polyamide, selected from the group consisting of PA1012 and PA1212,
   where the percentages are based on the entirety of components a) and b),
   wherein the composite part is a bodywork part of a motor vehicle, a constituent of the motor-vehicle interior, a cladding, a decorative strip, a cover strip, a panel, or a decorative element.

2. The composite part as claimed in claim 1, which is produced via reverse coating by an injection-molding, foaming, or compression-molding method.

3. The composite part as claimed in claim 1, wherein the film is composed only of the outer layer.

4. The composite part as claimed in claim 1, wherein the film is composed of two or more layers.

5. The composite part as claimed in claim 4, wherein the film comprises a color layer, a carrier layer, and/or an adhesion-promoter layer.

6. The composite part as claimed in claim 5, wherein the color layer and/or the carrier layer is present and comprises a polyamide elastomer or an impact-modifying rubber other than a polyamide elastomer.

7. The composite part as claimed in claim 1, wherein the film has a thickness of from 0.02 to 1.2 mm.

8. The composite part as claimed in claim 1, wherein the thickness of the outer layer is from 0.01 to 0.5 mm.

9. The composite part as claimed in claim 1, wherein component b) is PA1012.

10. The composite part as claimed in claim 9, wherein component a) is present in an amount of 10 to 45% by weight and component b) is in an amount of 55 to 90% by weight.

11. The composite part as claimed in claim 9, wherein component a) is present in an amount of 3 to 40% by weight and component b) is in an amount of 60 to 97% by weight.

12. The composite part as claimed in claim 9, wherein component a) is present in an amount of 3 to 20% by weight and component b) is in an amount of 80 to 97% by weight.

13. The composite part as claimed in claim 1, wherein component b) is PA1212.

14. The composite part as claimed in claim 13, wherein component a) is present in an amount of 10 to 45% by weight and component b) is in an amount of 55 to 90% by weight.

15. The composite part as claimed in claim 1, wherein component a) is present in an amount of 10 to 45% by weight and component b) is in an amount of 55 to 90% by weight.

16. A ski or snowboard topcoated with a film thereon capable of printed and/or colored having an outer layer which is transparent, and has initial gloss and retained gloss during use, and comprises:
   a) from 3 to 50% by weight of the polyamide PA11, and
   b) from 50 to 97% by weight of a polyamide, selected from the group consisting of PA1012 and PA1212,
   where the percentages are based on the entirety of components a) and b).

* * * * *